No. 873,910. PATENTED DEC. 17, 1907.
E. SPRUNG.
FRICTION CLUTCH.
APPLICATION FILED APR. 20, 1907.

2 SHEETS—SHEET 1.

WITNESSES:
Anna M. Dorr.
Anna M. Mayer.

INVENTOR
Edmund Sprung
By Barthel & Barthel
Attorneys

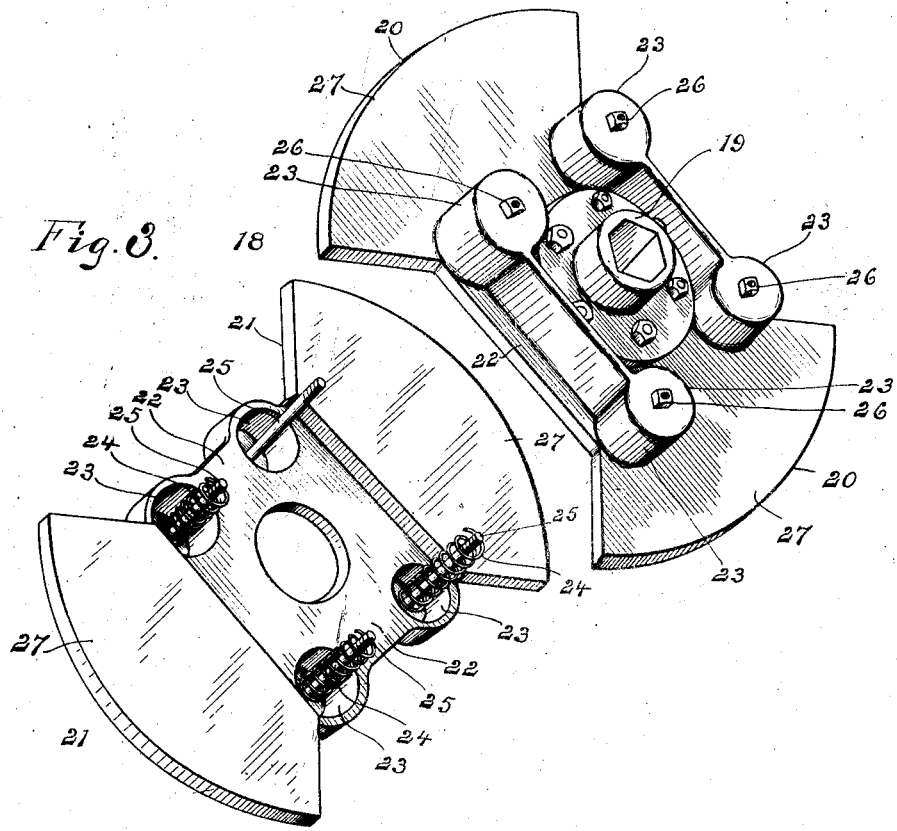

UNITED STATES PATENT OFFICE.

EDMUND SPRUNG, OF DETROIT, MICHIGAN.

FRICTION-CLUTCH.

No. 873,910.  Specification of Letters Patent.  Patented Dec. 17, 1907.

Application filed April 20, 1907. Serial No. 369,299.

*To all whom it may concern:*

Be it known that I, EDMUND SPRUNG, a citizen of the United States of America, residing at Detroit, in the county of Wayne and State of Michigan, have invented certain new and useful Improvements in Friction-Clutches, of which the following is a specification, reference being had therein to the accompanying drawings.

This invention relates to improvements in friction clutches, and its object is to provide a construction in which at the beginning of the clutch operation, there is a variable yielding frictional contact which permits of slippage but is sufficient to transmit motion at a slow speed, and upon the full operation, there is a positive clamping action which prevents any slippage and transmits full power and speed, sudden shocks and strains being thus prevented.

Figure 1:
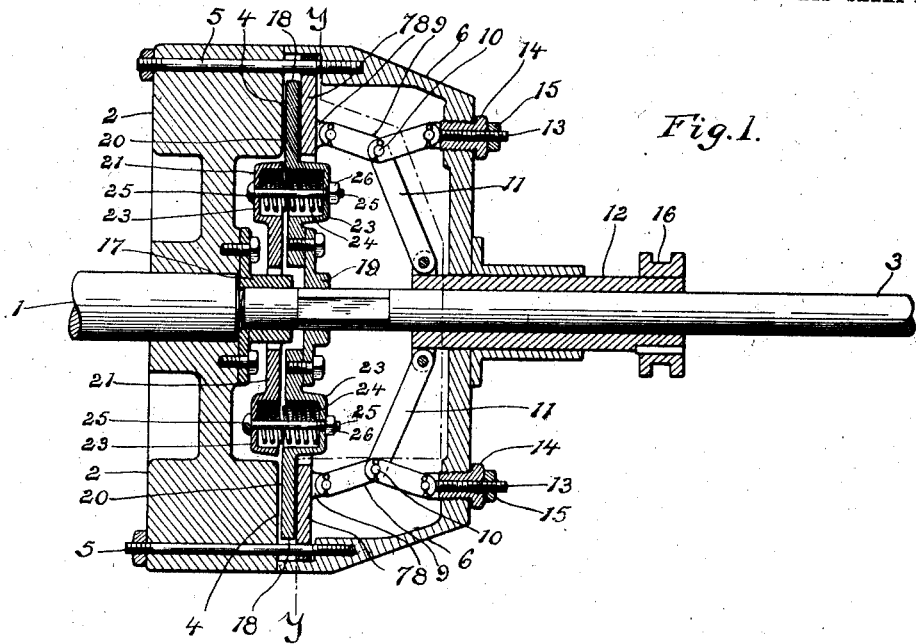
Figure 2:
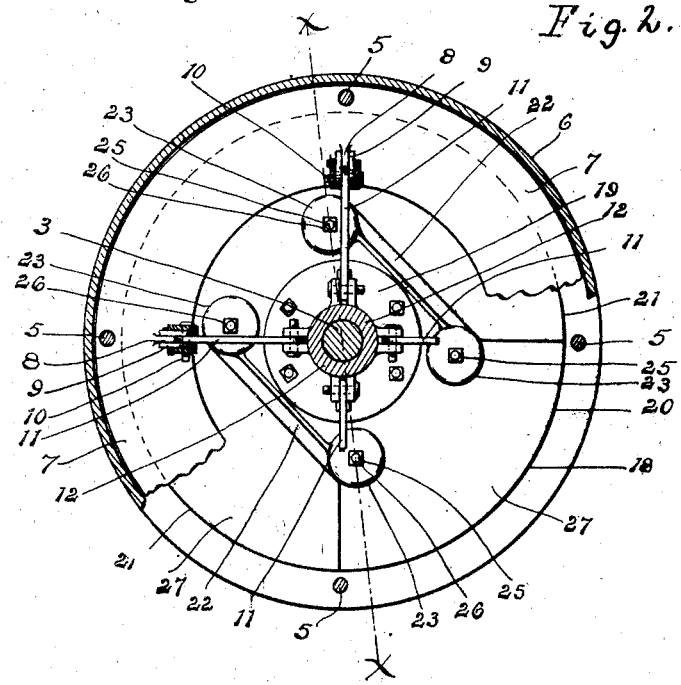

A further object of the invention is to provide means for forcing the clutch members into and out of frictional contact which means is easily actuated and is very positive in its operation, insuring against slippage when the members are fully thrown, and to provide certain other new and useful features in the construction, arrangement and combination of parts, all as hereinafter more fully described, reference being had to the accompanying drawings in which Figure 1 is a longitudinal section on the line $x$—$x$ of Fig. 2 of a device embodying the invention; Fig. 2 a transverse section of the same, substantially on the line $y$—$y$ of Fig. 1; and Fig. 3 is an enlarged detail of the two halves of the driven disk shown separated and in perspective.

As shown in the drawings, 1 is the driving or engine shaft upon the end of which is secured the flywheel 2 of the engine and 3 is the driven shaft. In the construction shown the rim of the flywheel is faced off at one side to form a friction surface or member 4 of the clutch, but if desired a face plate might be secured to the flywheel or a separate suitably constructed friction member might be provided, the flywheel being used for the purpose in this instance merely for convenience and cheapness of construction. Inclosing the surface 4 and rigidly secured to the flywheel by bolts 5, is a casing 6, and within the casing is a friction ring 7 which is movable toward and from the surface 4 and guided in such movement and carried around with the flywheel and casing by the bolts 5 passing through holes in the ring near its periphery. Extending from the rear side of said ring 7 are ears 8 to which toggle levers 9 are pivotally attached at one end, these levers consisting of links pivoted together at 10 and actuated by a connecting link 11 pivoted at one end to the pivot 10 and at its opposite end to a sleeve 12 slidable longitudinally upon the driven shaft. The rear ends of the toggle levers are pivotally secured between ears on the inner ends of screw-threaded bolts 13 engaging axial screw-threaded openings in bushings 14 which are screwed into openings in the end of the casing. These bushings are each provided on their outer end with a hexagonal head by means of which they may be turned and on the projecting outer ends of the bolts 13 are lock-nuts 15 to hold the bolts in any position to which they may be adjusted. These bolts may thus be readily adjusted in or out to vary the distance which the toggle levers will move the ring 7. The sleeve 12 projects outward through the casing and is provided with a groove 16 adapted to be engaged by any suitable levers for moving the sleeve to operate the toggles and shift the friction ring on the guide bolts toward and from the friction face of the flywheel.

A bearing 17 is secured in the flywheel at its axis to form a support for the end of the driven shaft 3 and said shaft, near this end, formed with a flattened or hexagonal portion upon which a driven friction disk 18 slides, the detachable hub portion 19 being formed with a hexagonal opening to fit the shaft so that the disk is attached to turn with said shaft but is free to slide longitudinally thereon.

The driven friction disk 18 consists of two parts or halves 20 and 21 each formed with a central rectangular portion 22 having an axial opening and provided with four sockets 23, one near each corner of the rectangular portion, for coiled springs 24 which are sleeved upon bolts 25 passing through the bottom of the sockets in their axes and provided with heads or nuts 26 on their outer ends. Extending laterally from opposite sides of each rectangular center portion, are segmental portions or flanges 27 which are of such a size and so formed as to fit together and make a complete circular friction rim portion, the rectangular center portion of the half 21 being offset out of the plane of its segments sufficiently to receive the center rectangular portion of the half 20 so that when the adjacent faces of the center portions are in contact the segments all lie in the same plane. The nuts or heads 26 on the bolts are so adjusted that the springs 24 normally hold the halves of the disk separated a short distance with the segments of one half slightly out of the plane of those of the other half, but not so far separated as to disengage the halves from each other.

The casing 6 being secured to the flywheel, where the driving or engine shaft is rotated, the flywheel, casing and friction disk 7 together with its toggle levers, rotate with said shaft, but the driven friction disk 18 being free to turn between the friction surface of the flywheel and the friction ring, no motion will be transmitted to the driven shaft. When the sleeve 12 is moved inward, the links 13 straighten out the toggles and thus force the friction ring laterally to clamp the segments of the driven disk between it and the friction surface of the flywheel. The toggles act directly between the rotatively fixed end of the casing and the ring, and thus the ring is moved laterally with a great deal of force, effectually clamping the driven disk and preventing any slippage after the ring has been moved to its full limit. The two halves of the disk 18 being normally held apart by the springs 24, when the ring is moved to clamp said disk it will at first contact the surface of the segments of one half only and the opposite surface of the segments of the other half or member of the disk will be forced into contact with the friction surface of the flywheel. The power of the springs is thus applied upon the partial movement of the ring, to hold the segments in frictional contact with the ring and surface 4, and this force which increases as the springs are compressed, is sufficient to transmit motion but will also permit slippage, thus preventing shocks and undue strains. When the ring has been moved sufficiently to compress the springs to such a degree that the adjacent sides of the two parts of the disk are in contact and their segments are in the same plane, the segments of both members will be contacted at both sides and rigidly clamped between the flywheel and the ring.

What I claim as my invention is:—

1. In a clutch, the combination of a friction disk or member having a smooth contact surface, a second friction member formed from a disk consisting of segments yieldingly held with their friction surface in different planes but registering with each other, and means for moving said second friction members into the same plane and into frictional contact with the other member.

2. In a clutch, the combination of a friction disk or member having a smooth contact surface, a second friction member consisting of a separable disk having two or more parts, one or more of which parts is yieldingly held nearer the friction surface of said first named friction member than the other or others when said friction members are in inoperative position, and means for bringing said parts into the same plane and said friction members into contact with each other.

3. In a clutch, the combination of a friction disk or member having a smooth contact surface, a second friction member consisting of a separable disk having a multiplicity of parts each having a friction surface adapted to engage the friction surface of the other friction member and each part yieldingly held with its friction surface normally out of the plane of the friction surface of the other part, and means for moving said parts into the same plane and one of said friction members into contact with the other.

4. In a clutch, the combination of a friction member having a contact surface, a friction disk having a sectional rim, the sections of which have friction surface and each section is normally held with its friction surfaces out of the plane of the friction surface of the adjacent section and adapted to be moved to bring the friction surfaces into the same plane, and means for bringing said disk and friction member into frictional contact and so moving the sections.

5. In a clutch, the combination of a friction member having a contact surface, a friction disk consisting of separate segments forming a continuous rim portion having a contact surface, means for yieldingly holding the segments out of alinement with each other, laterally of the disk, and means for bringing said friction member and disk into contact.

6. In a clutch, the combination of a clutch member having a contact surface at one side, a second clutch member attached to said member to turn therewith and adapted to be moved toward and from said surface of the first member, means for so moving said movable member, an intermediate clutch member interposed between said members and consisting of independent sections, and means for yieldingly holding said sections out of alinement with each other, whereby when the movable members are moved to clamp the intermediate member between it and the first named member, said sections will be first engaged at one side only.

7. In a clutch, the combination of circular clutch members having opposed contact surfaces and revoluble together, means for moving one of said members toward and from the other, a disk member with its rim portion formed of segments projecting between the contact surfaces of said members, and means for yieldingly holding each segment out of alinement laterally of the disk; with its adjacent segment.

8. In a clutch, the combination with a driving shaft and a driven shaft, of a clutch member secured upon the end of one shaft, a casing secured to said member and having an axial opening in its end through which the other shaft projects, a movable clutch member guided by and revoluble with the casing, a disk member slidable on the end of the shaft projecting into the casing and adapted to be clamped between the first named clutch member and the movable clutch member, toggle levers within the casing attached to the movable member and the end of the casing, and means for operating said toggle levers.

9. In a clutch, the combination with a clutch member having a contact surface, of a friction disk to engage said surface consisting of members having overlying center portions and interlocking rim portions forming a continuous friction surface, means between said disk members to yieldingly separate the same, and means for bringing the clutch member and disk into frictional contact.

10. In a clutch, the combination with a clutch member having a contact surface, of a friction disk to engage said surface consisting of members having overlying center portions and segmental rim portions which fit together to form a continuous friction surface, springs between said members to normally hold the same with the segments of one member out of alinement with the segments of the other member, and means for bringing the clutch member and disk into frictional contact.

11. In a clutch, the combination with opposed clutch members and means for moving one of said members toward the other, of a disk adapted to be clamped between said members at its outer edge and consisting of two members each having a rectangular center portion adapted to overlie that of the other member and each provided with segmental rim portions adapted to fit between the segments of the other member to form a continuous friction surface adapted to be engaged by the opposed clutch members, springs between the disk members, and means for limiting the separation of the disk members.

12. In a clutch, the combination with opposed clutch members and means for moving one of said members toward the other, of a disk consisting of two members each having a rectangular center portion provided with sockets and each having segmental rim portions fitting between the segments of the other member to form a continuous friction rim surface to be clamped between the opposed clutch members, bolts for securing the disk members together and permitting a limited movement thereof toward and from each other and coiled springs engaging the sockets in the disk members to normally hold said members separated the distance limited by the bolts.

13. In a clutch, the combination with a clutch member, of a casing secured to one side of said member and having an axial opening in its closed end, a shaft projecting through said opening into the casing, a laterally movable clutch ring in the casing, a disk slidable on the shaft and revoluble therewith with its periphery projecting between the clutch member and ring, toggle levers pivotally attached at one end to the ring, means secured in openings in the casing to which the opposite ends of the toggles are pivotally attached and which means are adapted to be adjusted to vary the throw of the toggles, a sleeve movable longitudinally on the shaft, and links pivotally attached to the sleeve and toggles.

14. In a clutch, the combination with a clutch member, of a casing secured to said member and having openings in its closed end, a laterally movable clutch member in the casing, a shaft projecting into the casing, a disk member on the shaft adapted to be clamped between the clutch members, toggle levers pivotally attached at one end to the laterally movable clutch member, bushings in the openings in the end of the casing having axial screw-threaded openings, screw-threaded bolts engaging said openings in the bushings and having ears on their inner ends for the attachment of the toggle levers, lock nuts on the outer ends of the bolts, and means for operating the toggles to move the laterally movable members.

15. In a clutch, the combination with a clutch member having a contact surface, of a disk adapted to engage said surface consisting of two members each having a rectangular center portion and segmental portions extending from said rectangular portions, the segments on one member being offset laterally so that when the rectangular portions of the members are in contact, their segments will lie in the same plane and interlock, springs between the members, and means for forcing said disk into contact with the clutch member.

16. In a clutch, the combination with a clutch member having a contact surface, of a disk adapted to engage said surface consisting of two members each formed with a rectangular center portion provided with sockets near each corner and also each formed with segmental portions projecting from the center portions and adapted to lie in the same plane and interlock with those of the other member to form a continuous rim friction surface, coiled springs in the sockets to normally hold the members separated laterally, bolts extending through holes in the bottoms of the socket and provided with heads and nuts to hold the members and limit their lateral separation by the springs, and means for forcing the disk against the contact surface of the clutch members.

17. In a clutch, the combination with a driving shaft and a driven shaft supported in axial alinement, of a clutch member having a contact surface at one end secured upon the end of the driving shaft, a casing secured to said member and inclosing said surface and provided with an axial opening for the driven shaft, a ring clutch member in the casing having openings, bolts extending through said openings forming guides for the lateral movement of the ring and securing the casing to the clutch member, ears on the ring, toggle levers pivoted to said ears at one end, bushings screwed into openings in the casing and having axial screw-threaded openings, bolts engaging said axial openings and having ears to which the toggles are pivotally attached, a sleeve movable longitudinally on the driven shaft, and projecting into the casing, links attached at one end to the sleeve and at their opposite ends to the toggles, a disk movable longitudinally of the driven shaft and rotatable therewith with its periphery between the ring and friction surface of the clutch member; said disk consisting of interlocking segmental members and springs to yieldingly hold said segmental disk members out of alinement with each other.

In testimony whereof I affix my signature in presence of two witnesses.

EDMUND SPRUNG.

Witnesses:
OTTO F. BARTHEL,
ANNA M. DORR.